(12) United States Patent
Mishra et al.

(10) Patent No.: US 10,868,732 B2
(45) Date of Patent: Dec. 15, 2020

(54) CLOUD RESOURCE SCALING USING PROGRAMMABLE-NETWORK TRAFFIC STATISTICS

(71) Applicant: SAP SE, Walldorf (DE)

(72) Inventors: Pritish Mishra, Bangalore (IN); Mayank Tiwary, Rourkela (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/372,711

(22) Filed: Apr. 2, 2019

(65) Prior Publication Data

US 2020/0322226 A1    Oct. 8, 2020

(51) Int. Cl.

| | |
|---|---|
| *G06F 15/173* | (2006.01) |
| *H04L 12/24* | (2006.01) |
| *H04L 12/26* | (2006.01) |
| *G06F 9/50* | (2006.01) |
| *G06F 11/30* | (2006.01) |
| *G06F 9/455* | (2018.01) |

(52) U.S. Cl.
CPC ........ *H04L 41/147* (2013.01); *G06F 9/45558* (2013.01); *G06F 9/505* (2013.01); *G06F 9/5077* (2013.01); *G06F 11/3006* (2013.01); *H04L 41/142* (2013.01); *H04L 41/5019* (2013.01); *H04L 43/062* (2013.01); *H04L 43/067* (2013.01); *H04L 43/0817* (2013.01); *G06F 2009/4557* (2013.01)

(58) Field of Classification Search
CPC . H04L 41/147; H04L 43/0817; H04L 43/062; H04L 43/067; H04L 41/5019; H04L 41/142; G06F 9/505; G06F 11/3006; G06F 9/5077; G06F 9/45558; G06F 209/4557

See application file for complete search history.

(56) References Cited

U.S. PATENT DOCUMENTS

| | | | |
|---|---|---|---|
| 2014/0280961 A1* | 9/2014 | Martinez | H04L 41/5054 709/226 |
| 2019/0014009 A1* | 1/2019 | Chuang | H04L 43/18 |

* cited by examiner

*Primary Examiner* — Thanh T Nguyen
(74) *Attorney, Agent, or Firm* — Buckley, Maschoff & Talwalkar LLC

(57) ABSTRACT

Some embodiments are associated with systems and methods to provide effective cloud-resource scaling (e.g., for virtual machines and containers). A data center computing system may collect programmable-network real-time traffic statistics associated with enterprise resource planning users. A network and enterprise resource planning load for the enterprise resource planning users may then be predicted (e.g., using a mathematical regression approach) based on an analysis of past programmable-network real-time traffic statistics and current enterprise resource planning user activity. According to some embodiments, the analysis includes time-domain network traffic clustering based on a pre-processing query level categorization. The data center computing system may then dynamically allocate network resources for the enterprise resource planning users based on the predicted network and enterprise resource planning load.

15 Claims, 14 Drawing Sheets

CLOUD RESOURCE SCALING USING PROGRAMMABLE-NETWORK TRAFFIC STATISTICS

TECHNICAL FIELD

Embodiments generally relate to methods and systems for use with computer devices, including networked computing devices. More particularly, embodiments relate to effective cloud-resource scaling using programmable-network real-time traffic statistics.

BACKGROUND

Network virtualization is used to increase the configurability of network appliances, such as routers, switches, etc., that make up a computing network for an enterprise. Control plane components, often implemented in software, provide instructions to data plane components, such as hardware network appliances. These instructions provide the network appliances with rules for treating incoming packets in connection with cloud-based platforms.

An enterprise may want to maintain a high Quality of Service ("QoS") and a very High Availability ("HA") for cloud-based platforms. For example, a cloud-based Platform-as-a-Service ("PaaS") offering way desire a very high QoS quotient and around 99.99% availability. When user activity induces a load that exhausts existing infrastructure resources of a PaaS, a system may increase resource scaling to support that activity. Such an approach is static and reduce the client experience, QoS, and/or service availability (causing a negative impact to the entire system). It may therefore be desirable to address this issue in a way that minimizes client downtime.

BRIEF DESCRIPTION OF DRAWINGS

The present disclosure is illustrated by way of example and not limitation in the following figures.

DETAILED DESCRIPTION

Figure 1:
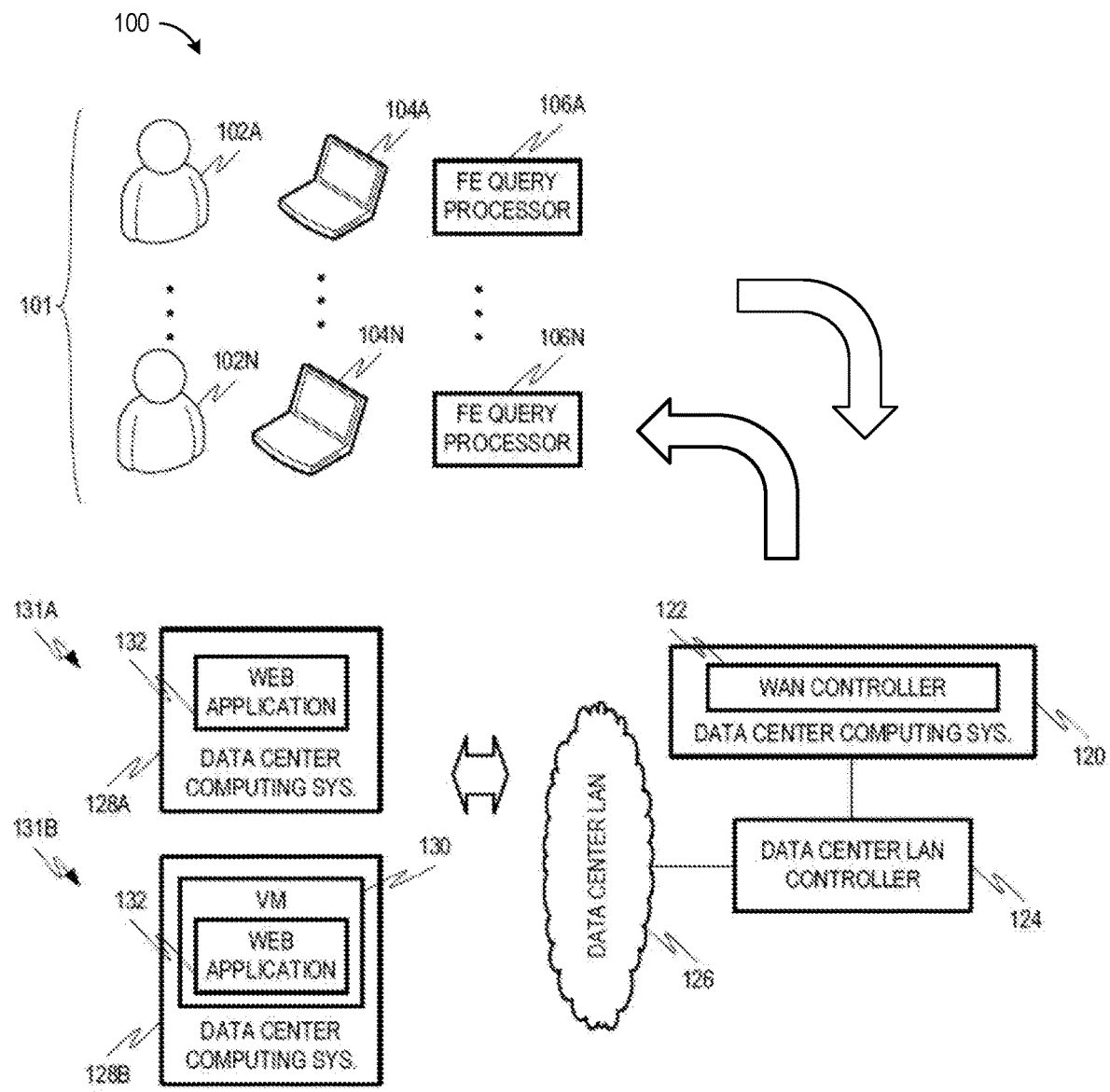
FIG. 1 is a diagram showing one example of an environment for implementing network virtualization for web application queries.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for implementing network virtualization in a web application environment. In a web application environment, a web application executes at a web application machine, which may be a physical or virtual machine. A user of the web application accesses the web application, for example, through a web browser executing at a user computing device. The user, through the web browser, sends a query to the web application requesting that the web application perform a particular processing task. The web application performs the requested processing task and sends a query reply back to the requesting user.

One example of a web application environment is the Business One Cloud suite of applications available from SAP SE of Waldorf, Germany. A user may have a set of queries that the user is permitted to make of the web application. When the web application includes an ERP application, such as the Business One Cloud suite of applications, example queries may include a request to view a purchase order, a request to view an inventory status, a request to add an invoice to an invoice record, etc.

The number and mix of queries directed to a web application may change over time. For example, not all users of the web application are active at any given time. Also, user permissions may change with time. For example, a user that is not permitted to make a particular query at one time may later be permitted to make that query. This means that static network configurations may not always operate at an acceptable level of efficiency.

Various examples described herein implement network virtualization to allow one or more of the networks traversed by web application queries to be configured based on how the web application is being queried at any particular time. This may increase the efficiency of the networks for the web applications.

Users may access the web application from user computing devices that execute a front-end query processor (e.g., associated with an Enterprise Resource Planning ("ERP") user). When the user makes a query, the front-end query processor sends the query to the web application machine that is executing the web application as a query message. The front-end query processor may direct the query message to a particular port of the web application machine, such as a Transport Control Protocol ("TCP") port. The selected port may indicate a type of the query. For example, the front-end query processor may direct query messages including queries of a first type to a first port of the web application machine; it may direct query messages including queries of a second type to a second port of the web application machine, and so on.

Various network controllers may be programmed to modify network appliances of the various networks transporting query messages to direct and prioritize the packets making up the query message. (Packets making up a query message are also referred to herein as query message packets.) For example, a tenant LAN controller may configure network appliances of the tenant LAN to assign query message packets to one of a set of queues. The particular queue to which a query message is assigned may be determined, for example, by the query type (e.g., indicated by the port to which the query message is directed). A WAN controller may configure network appliances of the WAN to select network paths for query message packets, for example, based on query type (e.g., indicated by the port to which the query message is directed, the queue to which the tenant LAN assigned query network packets, etc.) A data center LAN controller may configure network appliances of the data center LAN to direct query message packets, for example, based on query type, user, tenant, etc.

FIG. 1 is a diagram showing one example of an environment 100 for implementing network virtualization for web application queries. The example shown in FIG. 1 shows a single tenant 101, including users 102A, 102N, user computing devices 104A, 104N, front-end query processors 106A, 106N executing at the user computing devices 104A, 104N. The components might communicate, for example, via a tenant LAN and related infrastructure. In various examples, however, additional tenants may be included in the environment 100. Also, in different examples, tenants may include more, fewer, and/or different arrangements of components than what is shown in FIG. 1.

Users 102A, 102N utilize user computing devices 104A, 104N to send queries to a web application 132, which may execute at a web application machine 131A, 131B. Although two users 102A, 102N and user computing devices 104A, 104N are shown, the tenant 101 may include any suitable number of users and/or user computing devices. The user computing devices 104A, 104N may be or include any suitable type of computing devices including, for example, laptop computers, desktop computers, tablet computers, mobile computing devices, etc.

In some examples, when a user 102A, 102N requests a query, a front-end query processor 106A, 106N executing at the user's computing device 104A, 104N generates a query message including the query and sends the query message to the web application machine 131A, 131B. In some examples, the front-end query processors 106A, 106N are or include a script or other interpreted language instructions executed through a web browser executing at the user computing device 104A, 104N.

In some examples, the front-end query processor 106A, 106N determines type of the requested query and directs the query message to a port (e.g., a TCP port) of the web application machine 131A, 131B that corresponds to the query type. For example, query messages including queries of a first type may be directed to the web application machine 131A, 131B at a first port, query messages including queries of a second type may be directed to the web application machine 131A, 131B at a second port, and so on. As a part of sending the query message, the user computing device 104A, 104N may break the query message 111 into query message packets. The query message packets may include various metadata describing the query message, including the port to which it is directed.

The query message is directed to a web application machine. FIG. 1 shows two web application machines 131A, 131B demonstrating different example implementations. For example, web application machine 131A includes a data center computing system 128A that executes the web application 132. Web application machine 131B includes a data center computing system 128B that hosts a virtual machine 130 where the virtual machine 130 executes the web application 132. Data center computing devices 128A, 128B may be or include servers or other suitable computing devices. Data center computing devices 128A, 128B may be positioned at a single geographic location or across multiple geographic locations.

Upon receiving the query message, the web application 132 executes the included query and, in some examples, sends a reply message to the user 102A, 102N including results of the query. Executing the query may include performing any suitable type of processing. For example, queries to an ERP web application may include, for example, database queries regarding stored purchase orders, inventory levels, user records, accounts receivable, etc.

Between the user 102A, 102N and the web application 132, the query message may be communicated by several networks. A tenant LAN may be implemented by the tenant 101. For example, where the tenant 101 is an organization, such as a business, the tenant LAN may be or include an internal network of the organization. A WAN may include the Internet. In some examples, the WAN also includes network components implemented by an Internet Service Provider ("ISP") or other intermediate connection between the tenant LAN and the Internet. A query messages may pass through the WAN to a data center LAN 126 implemented at a data center hosting the web application 132.

The various networks may include various interconnected network appliances. A network controller 124 may configure the network appliances of the network 126 to direct and prioritize the packets making up queries, for example, based on current conditions. In some examples, the network controller 124 utilizes information about user queries that is generated by a backend query processor. The backend query processor may execute at a computing system, which may include any suitable server or other computing device.

Some embodiments described herein provide a system and method for effective cloud-resource (e.g., Infrastructure-as-a-Service ("IaaS") specific virtual machines, containers, etc.) scaling using programmable network (e.g., OpenFlow architecture) real-time traffic statistics. Some embodiments predict a network and ERP load based on the activity performed by users interacting from a front-end or ERP platform. This prediction may be based on a clustering approach in time-domain. In some cases, the cluster approach is followed by a delta-resource prediction module (e.g., using a mathematical regression approach). The prediction may depend on, for example, inputs from real-time user network activity. Embodiments may also design a network monitoring module using OpenFlow architecture to verify a user's activity and synchronous/asynchronous communication with a resource orchestrator running on the cloud.

Figure 2:
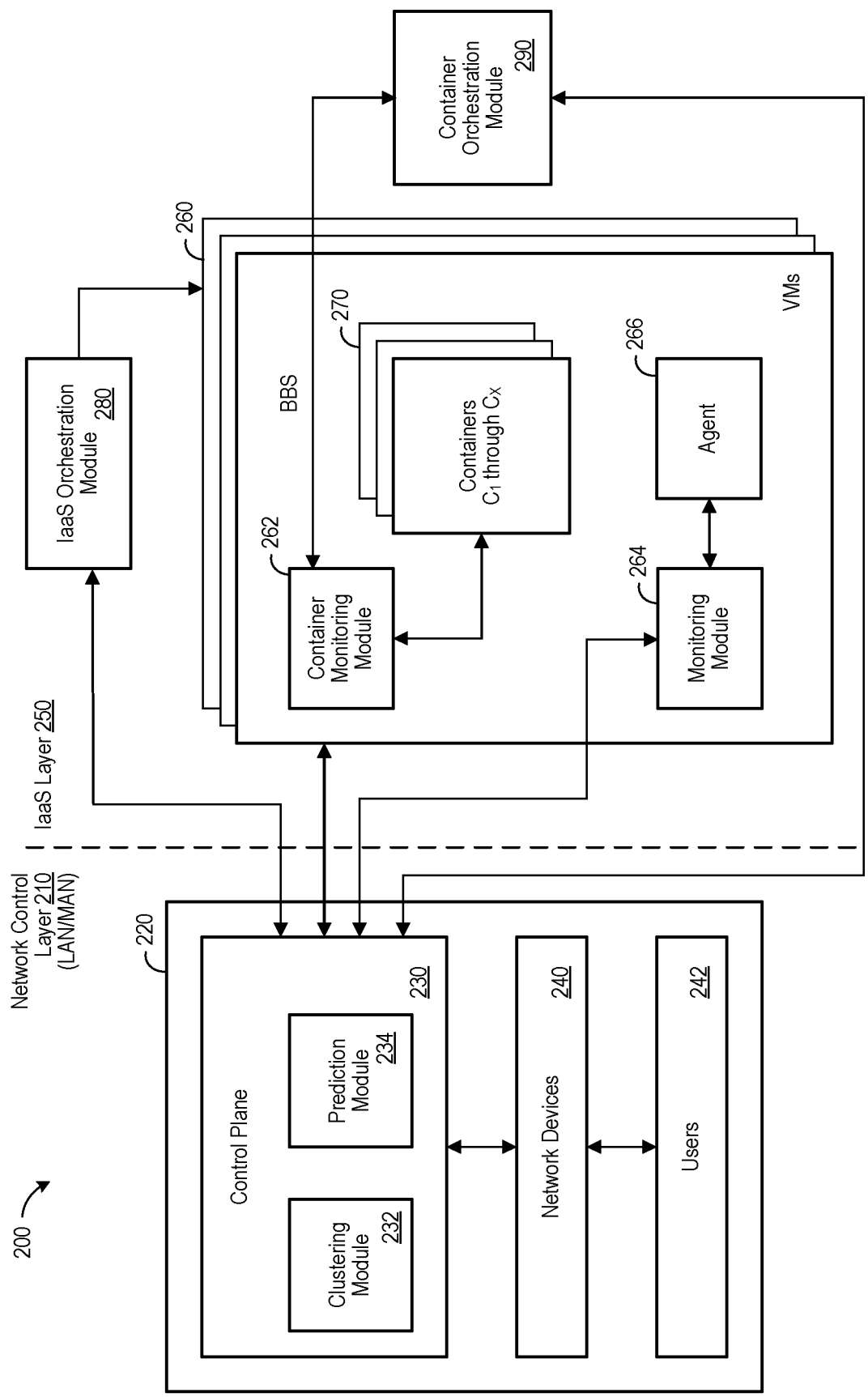
FIG. 2 represents a system illustrating an overall scenario according to some embodiments.

FIG. 2 represents a system 200 illustrating an overall scenario according to some embodiments. The overall scenario may be divided into two layers: a network control layer 210 and an IaaS layer 250. In a Medium Area Network ("MAN") or Local Area Network ("LAN") 220 of the network control layer 210, a control plane 220 may receive timeslot information from a monitoring module 264 and a container monitoring module 262 (e.g., and timeslot computations may take place in a prediction module 234). Based on this information, the control plane 230 may monitor users and their activity during the timeslot. This monitoring may be done using OpenFlow architecture. The control plane 230 also sends the signal to an IaaS orchestration module 280 about when to upscale or downscale resources. This monitoring may be done by the control plane 230 using network devices 240 for users 242 and the software defined network technology. In the IaaS layer 250, an IaaS orchestration model 280 may be responsible for controlling the spawning of virtual machines 260 and a controls orchestration module 290 may controlling the spawning of containers 270. Upon receiving the signal from control plane 230, it increases the number of virtual machines 260 (upscale) or decreases the number of virtual machines 270 (downscale) in the IaaS layer 250. Similarly, the container orchestration module 290 increases (upscale) or decreases (downscale) the number of containers 270 in the virtual machines 270. The container monitoring module 290 may also monitor the activity of users 242 interacting with the containers, $C_1$, $C_2$, etc. It sends the user activity information (an amount of memory utilized, an amount of Central Processing Unit ("CPU") utilized, etc.) to the control plane 220, which then stores it in a time-based history format. A similar function may be performed by a monitoring module 264 and agent 266 for the virtual machines 260 and it may also send the resource usage details of the virtual machines (by each user activity) to the control plane 230 which again stores and maintains the information in a time-based history format. Based on the information collected regarding the activity and resource-usage details of each user, the control plane 230 may use a clustering module 232 and/or the prediction module 234 to decide when to upscale or downscale resources. This decision may then be transmitted to the IaaS orchestration module 280 and/or container orchestration module 290.

Note that the network layer 210 is based on the openflow architecture. The control plane 230 monitors the network devices 240 and the programmable logic of these network devices 240 resides in the control plane 230. Any interaction by a user 242 over the network (for running operations on the application) occurs through the network devices 240. Thus, user 242 presence and usage can be monitored by the control plane 230 via the network devices 240.

Based on the statistics received by the control plane 230, there are a few modules executing in the control plane 230 such as the prediction module 234 and a scaling recommendation module. The prediction module 234 may be responsible for predicting the load to be exerted by a user, if the presence of user is detected in the network. the prediction module performs this prediction activity with the help of clustering modules and GRRN recommendation engine executing as part of the control plane. The clustering modules and recommendation engine utilize various machine learning frameworks to facilitate this process. Thus, the output of prediction module is, if a user A is detected to be present in the network, then he or she is obviously expected to perform some operations on an application. The prediction module determines an expected resource utilization load that would be caused by such an activity. Lastly, depending on the prediction provided by the prediction module, the scaling recommendation module determines if the current quota of the container (and/or the virtual machine) can meet such a resource utilization request. If yes, then, there is no operation required. If not, the system asks for increased resources. If no such heavy resource utilization is expected, the scaling recommendation can ask for a decreased resources. From an implementation point of view, given the relevant statistics, these machine learning algorithms can be defined and implemented. There are various frameworks such as tensorflow, scikit-learn, etc. that can be used to design such a solution.

Figure 3:
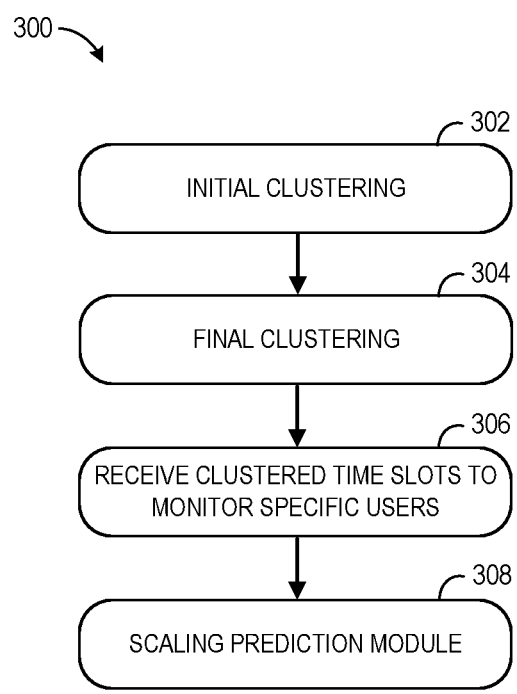
FIG. 3 is a flowchart illustrating an overall method in accordance with some embodiments.

FIG. 3 is a flowchart illustrating an overall method 300 in accordance with some embodiments. After an initial cluster process is performed at 302, the system may perform a final cluster process at 304. Clustered timeslots may be received at 306 to monitor specific users. At 308, a scaling prediction model can recommend upscaling or downscaling as appropriate. Each of these steps are described in detail in connection with FIGS. 4 through 7.

First, however, consider three users A, a nodej s, and application running on a container. The application might comprise, for example, a 3-tier architecture with data backed on a database process (postgresql) either running in another container or virtual machine. Now out of all the views in the application, user A has access to 30 views out of potentially 144 views. Each view has buttons, text fields, etc. that intakes data from users and has an ability to perform all Create, Read, Update, Delete ("CRUD") operations. The set of 30 views accessed by the user A comprises around 208 Structured Query Language ("SQL") queries in the backend. For example, a might want to search something through a text field. The search may trigger a SQL query in the backend with specific search parameters or variables. When users access any view, the operations through the views are logged (indirectly, the system may get the logs of SQL queries triggered by the user). This log is time-series data including the timestamp when the query was fired. Now, based on the monthly logs and the algorithm in FIGS. 4 and 5, the system may get an overall prediction, when the user fires various levels of queries (each query is classified to a specific level $L1, L2, \ldots, Ln$).

In an OpenFlow architecture switches at the user site have flow tables that store all the rules the user requires to access the 30 views of the application. If the flow table is empty (or the rules needed to switch the traffic of user A for the same application is missing), the switch triggers a packet_in message to the control plane. Now assume a user who just joined the network, causing a user device to trigger an Address Resolution Protocol ("ARP") request to resolve an Internet Protocol ("IP") address to a Media Access Control ("MAC") address. According to current flow eviction strategy in OpenFlow, if the user has not been seen in the network for a longer time, the control plane removes the flow entries corresponding to the user. An example of a flow entry might comprise:

Source Addr: 172.168.29.1 Destination Address: 8.8.8.8, Source Port: 12311 Destination Port: 53, Source MAC: AAA,
Dest MAC: BBB, In_Port: 10, timeout: 5 s Action: Forward to
Out_port: 19

This is an example of a flow rule/flow table entry from user A sending a Domain Name System ("DNS") request to public DNS 8.8.8.8. Where the applicable rule is "forward any packets with headers matched with above criteria to out port 19." Similarly, when the user accesses the application running on any cloud platform, the corresponding flow entries needs to be maintained, which also gets flushed out after 5 seconds of timeout value.

As a result, when a user is first seen in the network (seen after a long time in the network) and accesses any resource through the underlying same network, in absence of flow entries in the flow table will incur a flow miss causing a packet_in to control plane with all details for the flow miss.

Embodiments may utilize this principle of the OpenFlow architecture to monitor the user's activity across the underlying software defined network.

Figure 7:
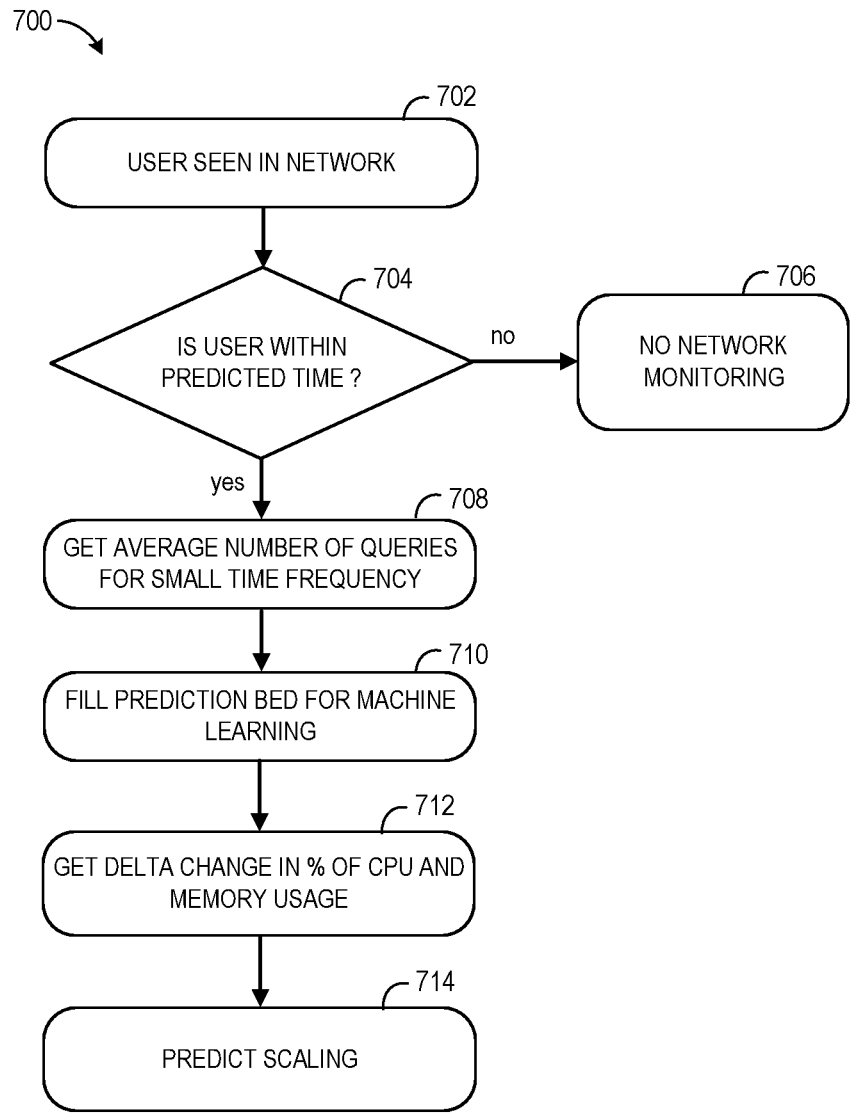
FIG. 7 is a flowchart illustrating a scaling prediction module method in accordance with some embodiments.

When the user A is seen in the network, the control plane estimates the rise in CPU and memory of the container (where the application is running) using the predictions computed earlier through time-series log analysis by filling the prediction bed (as defined in FIG. 7). According to the defined algorithm, if a hike in CPU/memory is predicted and the container may run out of computing resources, the control plane reports to the container orchestration module, which upscales the container with more computing resources as per defined agreement within the SLA. A similar scenario occurs when a user leaves the network, where the prediction bed predicts decrease in the overall CPU/memory usage for the container and the container is downscaled. The strategy also occurs with a virtual machine resource add/delete.

Figure 4:
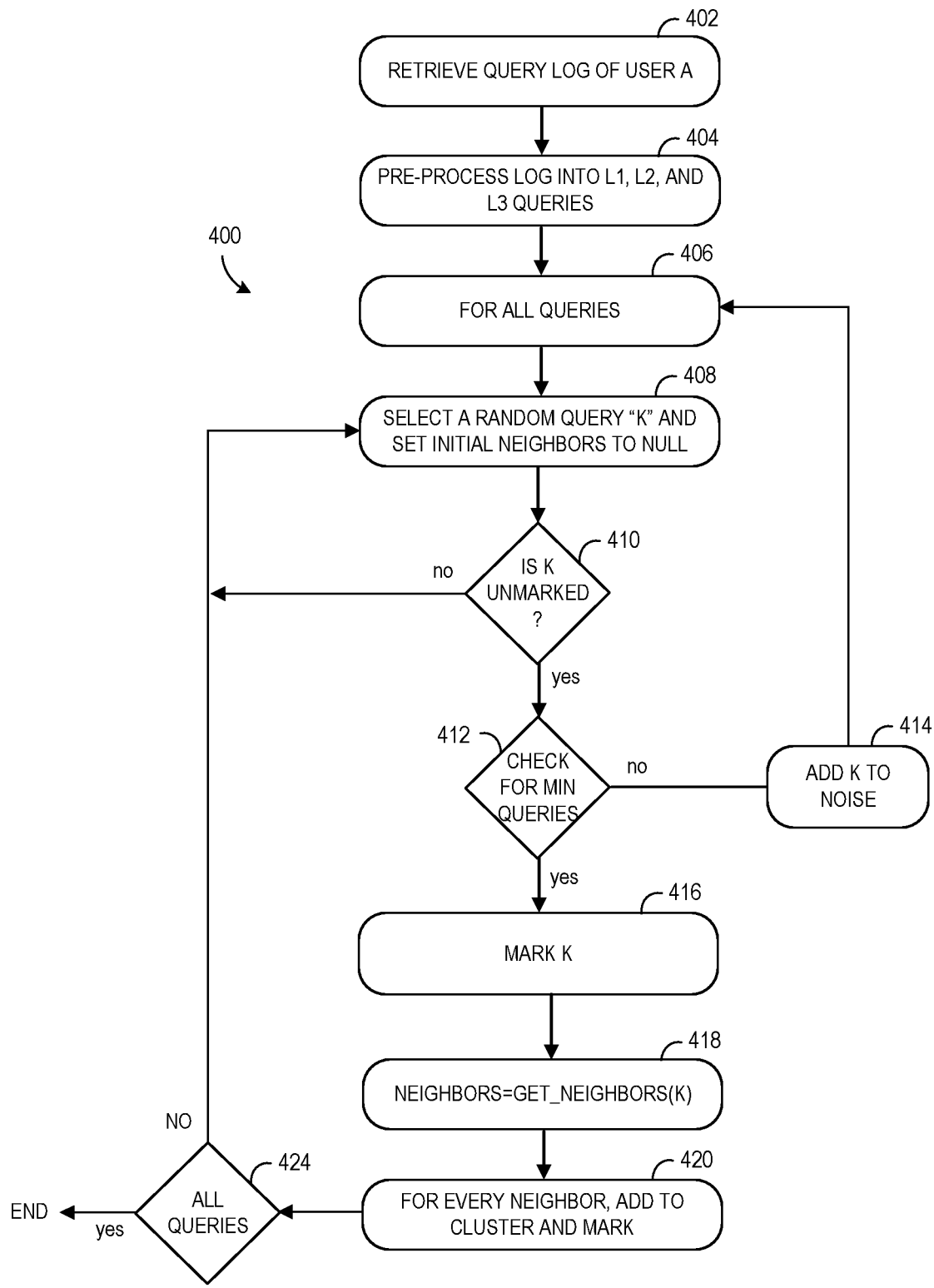
FIG. 4 is a flowchart illustrating an initial clustering module method according to some embodiments.

As a whole, this strategy can be applied on any web-based application using a PaaS offering when the user site network's control plane synchronizes with the control plane at the data center. FIG. 4 is a flowchart illustrating an initial clustering module method 400 that might be triggered periodically in a prediction module running in the IaaS layer. A query log is received at 402 and stored by a control plane from respective monitoring modules running in the IaaS layer. The initial clustering module first retrieves this query log for all queries and extracts the query log for a particular user A. It then classifies the queries present in the log into categories levels L1, L2, L3, etc. at 404. This pre-processing classification is done for all queries at 406 on the basis of normalized response time values. The initial clustering module may them form clusters (groups) of queries based on time and level of query. In particular, a random query "K" may be selected and initial neighbors may be set to null at 408. If K is not unmarked at 410, the process continues at 408. If K is unmarked at 412 the system checks for min queries at 412. If a query cannot be placed in a cluster, it may be considered noise at 414. Otherwise, K may be marked at 416, neighbors may be set to get_neighbors(K) at 418, and every neighbor may be added to a cluster as appropriate and marked at 420 until all queries have been processed at 424. As a result of this module, clusters of queries are obtained arranged along a time axis. This initial clustering module might run, for example, for each user and on each day.

Using every query which is fired from user front-end or ERP platform, the system may calculate an overall response time (computational execution) including a database execution time. After this, the system may normalize the response time and, based on the normalized score, classify the query based on the respective normalized score. Note that a query may be a user-facing operation performed on an ERP User Interface ("UI") that can perform a read/write operation on a database layer or a computation-intensive operation on the backend. The log that is passed to this module may contain queries fired from each user and the respective timestamp when it was fired. As specified in the initial steps, the module parses the log for a specific user and filters the same for further processing. As a result, the system determines multiple clusters, where each cluster defines the start and the end timestamps (and the difference in the timestamps represents the total range of the cluster).

Figure 5:
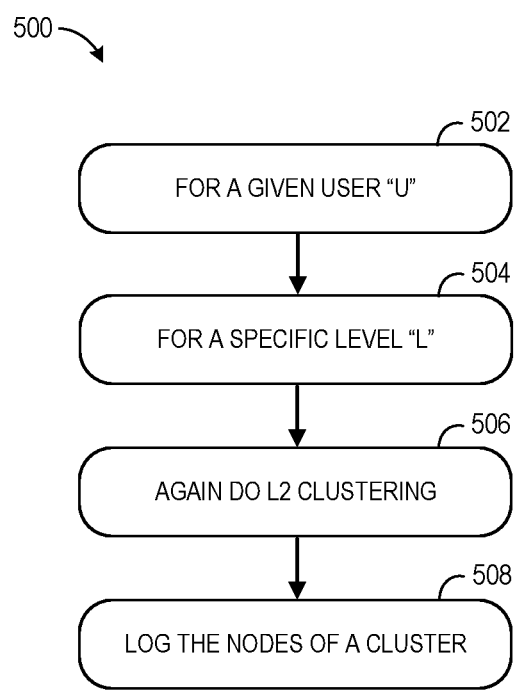
FIG. 5 is a flowchart illustrating a final clustering module method in accordance with some embodiments.

FIG. 5 is a flowchart illustrating a final clustering module method 500 in accordance with some embodiments which basically aggregates the clusters obtained by the initial clustering module. As an input, the system may utilize clusters of queries for each user and each level of query at 502. This module may further cluster the clustered nodes (obtained from previous module for the entire month/user-defined time-period) for all users and all levels at 504 and 506 to obtain aggregated clusters. These may then be logged as final cluster nodes at 508. Note that the previous module usually calculates the time-clusters for a specific user for each day for queries of a specific level. Now, this module receives the monthly clustered data and uses it for a next-level cluster aggregation. The algorithm in this module may compute and return, for example, aggregated time clusters for the whole month for all users and respective levels. Finally, the system stores the cluster timings and passes them to monitoring module (which then starts monitoring the users on the total time-range obtained from the clusters).

Figure 6:
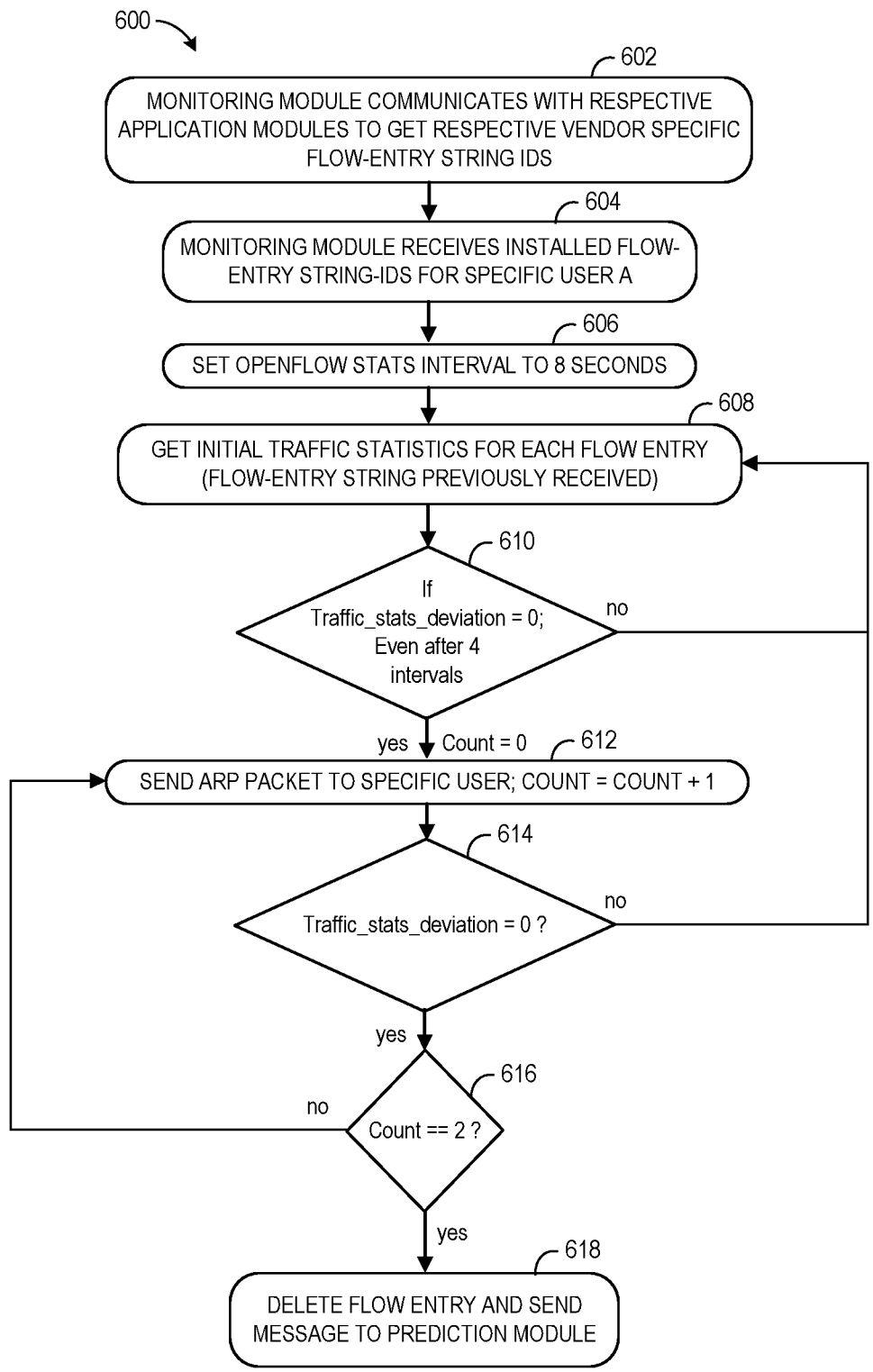
FIG. 6 is a flowchart illustrating a method to monitor a specific user according to some embodiments.

FIG. 6 is a flowchart illustrating a method 600 to monitor a specific user according to some embodiments. When clustered timeslots are received for monitoring specific users, the timeslots may be computed from previous prediction modules. At 602, the monitoring module (running as a northbound application on a Software Defined Network ("SDN") controller deployed at user site or an Internet Service Provider ("ISP") network) sends a message to another vendor specific application deployed to get a flow-rule base (flow entry string Identifier ("ID")). At 604, the other application responds with the flow-entry string IDs to the monitoring module for a specific user A (for example, if a user has an IP of 3.3.3.3, then all rules related to the source or destination IP as 3.3.3.3 may be installed using vendor specific applications). As a result, the monitoring module gets all the flow entries of a specific user for which the actual traffic monitoring is done. The monitoring module has some static parameters such as the timer, which is set to an 8 second default at 606 before the start of the module. The SDN controller now collects traffic statics related to flow entries. As per the OpenFlow specification, the controller (after every 8 seconds) sends a flow_Stats_request packet to respective switches where the flow entries are installed and then the switches or OpenFlow enabled devices reply with a flow_stats packet (which contains the actual traffic statics against the respective flow entries) at 608. With every statistics collection trigger, the controller may get the initial packet counts against the flow entries and check the deviations with the next trigger. Initially, the controller checks the statistics deviations for 4 intervals. If no traffic is observed at 610, the controller sends out an ARP packet_outs to switches at 612 to check user system status (because a system should respond if it receives any ARP packet). The module sends 2 ARPs after at the end of timeslot at 614 and 616. If after two ARPs also no deviation is seen on the flow entries, the user is suspected to have left the network at 618 and the monitoring module sends message to the prediction module with the same information. If the user is again detected back in the same clustered timeslot, the controller may again start the same process.

FIG. 7 is a flowchart illustrating a scaling prediction module method 700 in accordance with some embodiments. In this module, the system looks for the presence of a user within the network. If a user is observed to be logged within the network at 702, the system checks if the current time falls within the predicted time-slot for the user at 704 (which was obtained as part of the previously explained clustering modules). If the user is detected outside the predicted time-slot, the prediction module evaluation is skipped at 706 (e.g., and static scaling methods might be employed, if desired). On the other hand, if the user is detected within the predicted time-slot at 704, a prediction module evaluation is employed as follows. At 708, an average number of queries is obtained for a small time-slot (e.g., with a duration defined by an administrator) and used to fill a prediction bed 710. Some embodiments use this prediction bed and a machine learning algorithm to predict a delta change in resources at 712 that could be caused by the presence of this particular user. The resources might represent, for example, a CPU utilization percentage, an amount of memory used, etc. If the delta change plus the current usage exceeds a threshold value (e.g., set by an administrator), the system predicts upscaling at 714 for the orchestration modules in the IaaS layer. Similarly, if the delta change plus the current usage is below a threshold value (e.g., set by the administrator), the system predicts downscaling at 714 for the orchestration modules in the IaaS layer.

Initially this module may be triggered when it receives a signal from the network monitoring module. The network monitoring module sends signals whenever it detects the presence of the user in the network during the defined time-slot obtained from previous modules. Then, the process evaluates the average queries belonging to a specific level, fired by the specific user, averaged over each day of the month, for the designated time-slot. Since the time-slot is obtained from the clustering module, averaging the queries for that slot over all days of the month, gives a statistical metric to predict the load which can be caused by the user. Next, from the sampled queries from the log, the system fills the prediction-bed for predicting the delta change (increase/decrease) in the resources parameters (a CPU percentage utilization value, memory usage, Input Output ("IO") values, etc.). This resource-change prediction might be implemented, for example, using a regression-based machine learning approach.

Consider, for example, a user who has deployed an application or a bunch of applications running within a container. This container is hosted in a virtual machine is spawned by an IaaS provisioner (e.g., AWS®, MICROSOFT AZURE®, ALICLOUD, etc.). The container is associated with some resource limits that are exerted by a platform manager (e.g., DOCKER®, SWARM MANAGER®, CLOUDFOUNDRY®, etc.) which is facilitating/serving the platform to the user. The virtual machine also has a corresponding resource limit exerted by the IaaS provisioner.

The application deployed by the user consumes resources based on usage. Thus, upon spiked usage of the application(s), resource consumption might exceed the assigned quota of resource limit. As a result, the application crashes and an upscaling is required to serve the requested amount of usage. Upscaling might be required for the container (increasing the resource quota of the container) or for the virtual machine (if the virtual machine doesn't have enough resources to upscale the resource quota of the container, then the virtual machine itself needs to be upscaled).

To address this issue, many reactive solutions have been proposed and are deployed in existing frameworks. However, since the reactive solutions involve significant downtime and disruption of service, predictive solutions have started to gather prominence. There are prevalent predictive solutions too in this domain. However, embodiments described herein may leverage the real-time network traffic statistics and capture the behavior of the user using OpenFlow architecture. Based on this behavior, the model predicts the behavior of the user and makes a decision of whether to upscale or downscale depending on the upcoming load on the applications.

Some embodiments described herein use two monitoring modules in the proposed architecture: (1) a container monitoring module, and (2) a virtual machine monitoring module. Both the modules observe the user activity and keeps a record of this information in a time-series format. The user activity deals with three main aspects:

Which user is online (and at what duration)?
What is the resource utilization triggered by the user during this time-interval?(and resource utilization might include memory utilized, CPU utilization, etc.)
The kind (level) of queries/operations performed by the user during this time duration.

This information may be collected and stored by the monitoring module for a substantially long period of time. From an implementation point of view, this module may be straight-forward to implement because each user is identified by a unique identification code. The delta of resource utilization for the user can be evaluated using the Linux utilities like "top" or Kernel probes like "ebpf." The queries are provided by the logs of the database application or might be obtained by a spoofing middleware that captures the queries executed (the level of queries may be decided by the clustering algorithm). The information collected by the monitoring module(s) may be forwarded to the control plane 230 for further processing.

Figure 8:
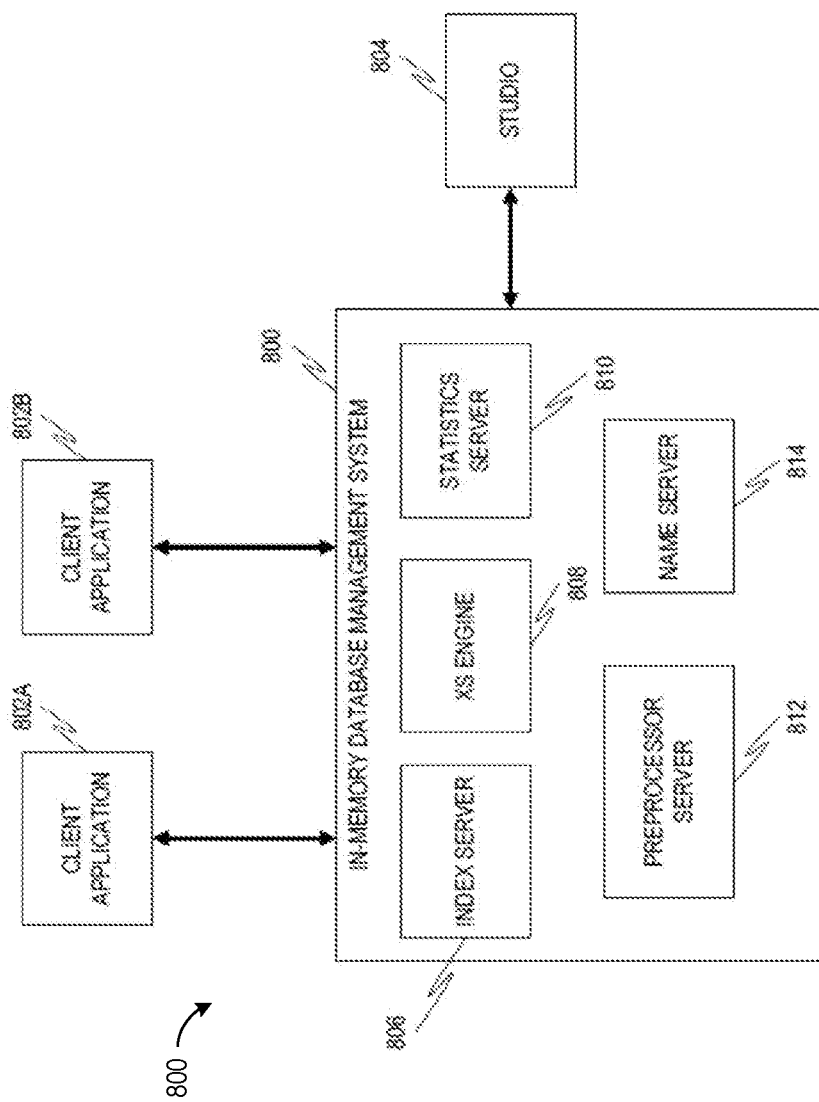
FIG. 8 is a diagram illustrating an example of an in-memory database management system 800 that may be used to implement a web application in some examples of the network virtualization systems and methods described herein.

FIG. 8 is a diagram illustrating an example of an in-memory database management system 800 that may be used to implement a web application in some examples of the network virtualization systems and methods described herein. An in-memory database stores data primarily at main memory, such as a Random Access Memory ("RAM"). This is different than databases that primarily employ a disk storage mechanism. In some examples, the database management system 800 may be or include an example of the HANA system from SAP® SE of Waldorf, Germany. Although various features of web applications are described herein in the context of an in-memory database, network virtualization for web application queries may be generally performed for any type of web application using any suitable type of database.

The in-memory database management system 800 may be coupled to one or more client applications 802A, 802B. For example, client applications 802A, 802B may be examples of the web application 132 described herein. Client applications 802A, 802B may execute one or more queries utilizing data from the database including, for example, presenting a user interface (UI) to one or more users, entering data, accessing data, etc. The client applications 802A, 802B may communicate with the in-memory database management system 800 through a number of different protocols, including Structured Query Language ("SQL"), Multidimensional Expressions ("MDX"), Hypertext Transfer Protocol ("HTTP"), Representational State Transfer ("REST"), Hypertext Markup Language ("HTML"), etc.

FIG. 8 also shows a studio 804 that may be used to perform modeling by accessing the in-memory database management system 800. In some examples, the studio 804 may allow complex analysis to be performed on data drawn not only from real-time event data and windows, but also from stored database information.

The in-memory database management system 800 may comprise a number of different components, including an index server 806, an XS engine 808, a statistics server 810, a preprocessor server 812, and a name server 814. These components may operate on a single computing device, or may be spread among multiple computing devices (e.g., separate servers). The index server 806 contains the actual data and the engines for processing the data. It may also coordinate and uses the other servers.

The XS engine 808 allows clients to connect to the in-memory database management system 800 using web protocols, such as HTTP. Although the XS engine 808 is illustrated as a component of the in-memory database management system 800, in some examples, the XS engine may be implemented as one or more Application Program Interfaces (APIs) and/or services positioned between the client applications 802A, 802B and the in-memory database management system 800. For example, the XS engine 808 may be configured to perform the functions of the privilege filter 118 for client requests received in languages other than SQL such as, for example, MDX, HTTP, REST, HTML, etc.

The statistics server 810 collects information about status, performance, and resource consumption from all the other server components. The statistics server 810 can be accessed from the studio 804 to obtain the status of various alert monitors. The preprocessor server 812 is used for analyzing text data and extracting the information on which the text search capabilities are based. The name server 814 holds information about the database topology. This is used in a distributed system with instances of the database on different hosts. The name server 814 knows where the components are running and which data is located on which server. In an example embodiment, a separate enqueue server may operate in the manner described above with respect to enqueue servers, specifically with regard to creating and managing light-weight enqueue sessions.

Figure 9:
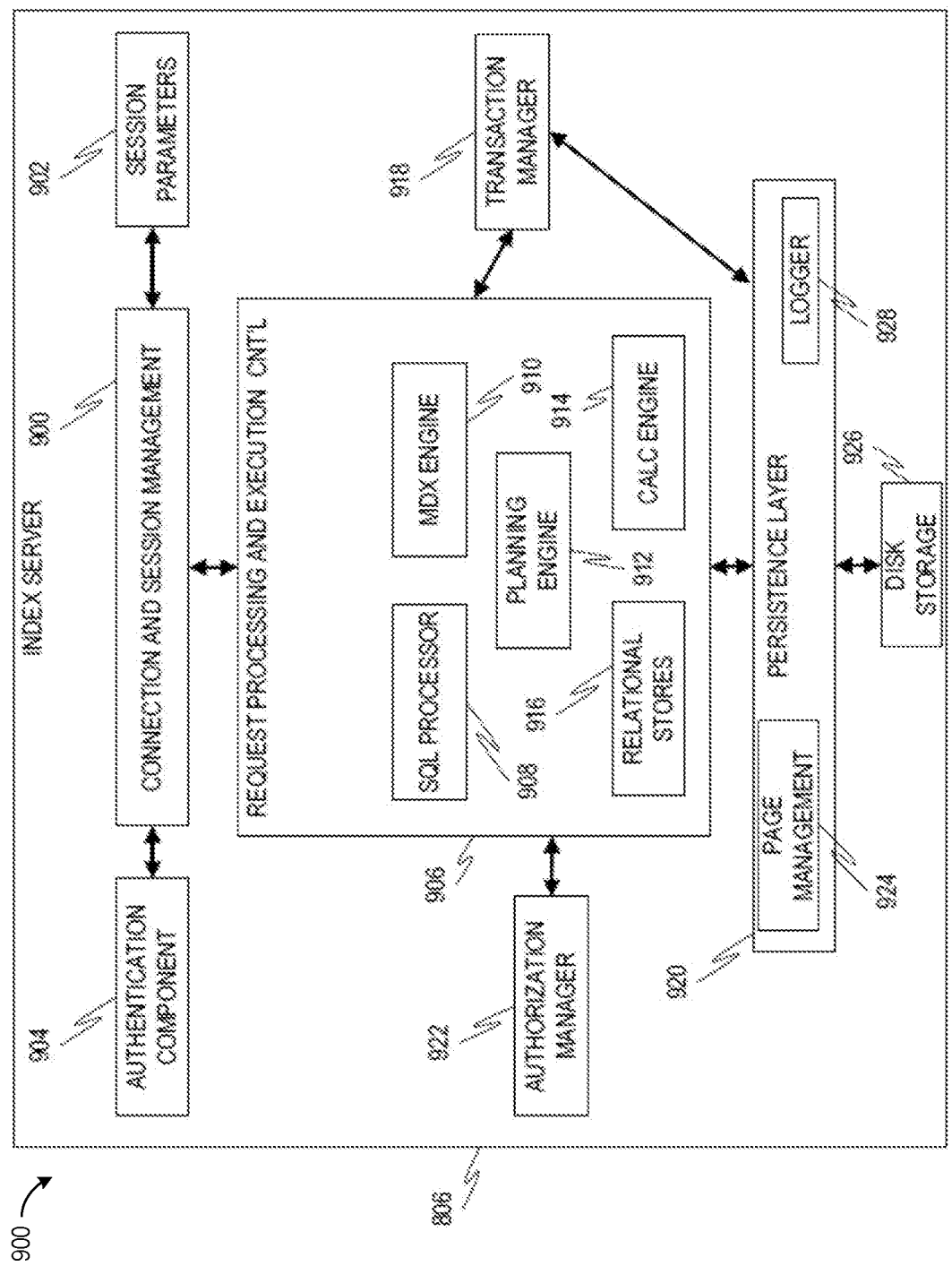
FIG. 9 is a diagram illustrating an example of the index server of FIG. 8.

The index server 806, in some examples, may house an instance of the privilege filter 118. The instance of the privilege filter 118 at the index server 806 may be in addition to or instead of the instance of the privilege filter 118 at the XS engine 808. FIG. 9 is a diagram illustrating an example of the index server 806. Specifically, the index server 806 of FIG. 8 is depicted in more detail. The index server 806 includes a connection and session management component 900, which is responsible for creating and managing sessions and connections for the database clients (e.g. client applications 802A, 802B). Once a session is established, clients can communicate with the database system using SQL statements. For each session, a set of session parameters 902 may be maintained, such as auto-commit, current transaction isolation level, etc. Users (e.g., system administrators, developers) may be authenticated by the database system itself (e.g., by logging in with log-in information such as a user name and password, using an authentication component 904) or authentication can be delegated to an external authentication provider such as a Lightweight Directory Access Protocol ("LDAP") directory.

Client queries can be analyzed and executed by a set of components summarized as request processing and execution control 906. An SQL processor 908 checks the syntax and semantics of the client SQL statements and generates a logical execution plan. MDX is a language for querying and manipulating multidimensional data stored in OLAP cubes. As such, an MDX engine 910 may be provided to allow for the parsing and executing of MDX commands. A planning engine 912 allows applications to execute basic planning operations in the database layer. One such operation is to create a new version of a dataset as a copy of an existing dataset, while applying filters and transformations.

A calculation engine 914 implements the various SQL script and planning operations. The calculation engine 914 creates a logical execution plan for calculation models derived from SQL script, MDX, planning, and domain-specific models. This logical execution plan may include, for example, breaking up a model into operations that can be processed in parallel. The data is stored in relational stores 916, which implement a relational database in main memory. Each SQL statement may be processed in the context of a transaction. New sessions are implicitly assigned to a new transaction. A transaction manager 918 may coordinate database transactions, controls transactional isolation, and keeps track of running and closed transactions. When a transaction is committed or rolled back, the transaction manager 918 informs the involved engines about this event so they can execute needed actions. The transaction manager 918 also cooperates with a persistence layer 920 to achieve atomic and durable transactions.

An authorization manager 922 is invoked by other database system components to check whether the user has the specified privileges to execute the requested operations. The database system allows for the granting of privileges to users or roles. A privilege grants the right to perform a specified operation on a specified object.

The persistence layer 920 ensures that the database is restored to the most recent committed state after a restart and that transactions are either completely executed or completely undone. To achieve this goal in an efficient way, the persistence layer 920 uses a combination of write-ahead logs, shadow paging, and save points. The persistence layer 920 also offers a page management interface 924 for writing and reading data to a separate disk storage 926, and also contains a logger 928 that manages the transaction log. Log entries can be written implicitly by the persistence layer 920 when data is written via the persistence interface or explicitly by using a log interface.

Figure 10:
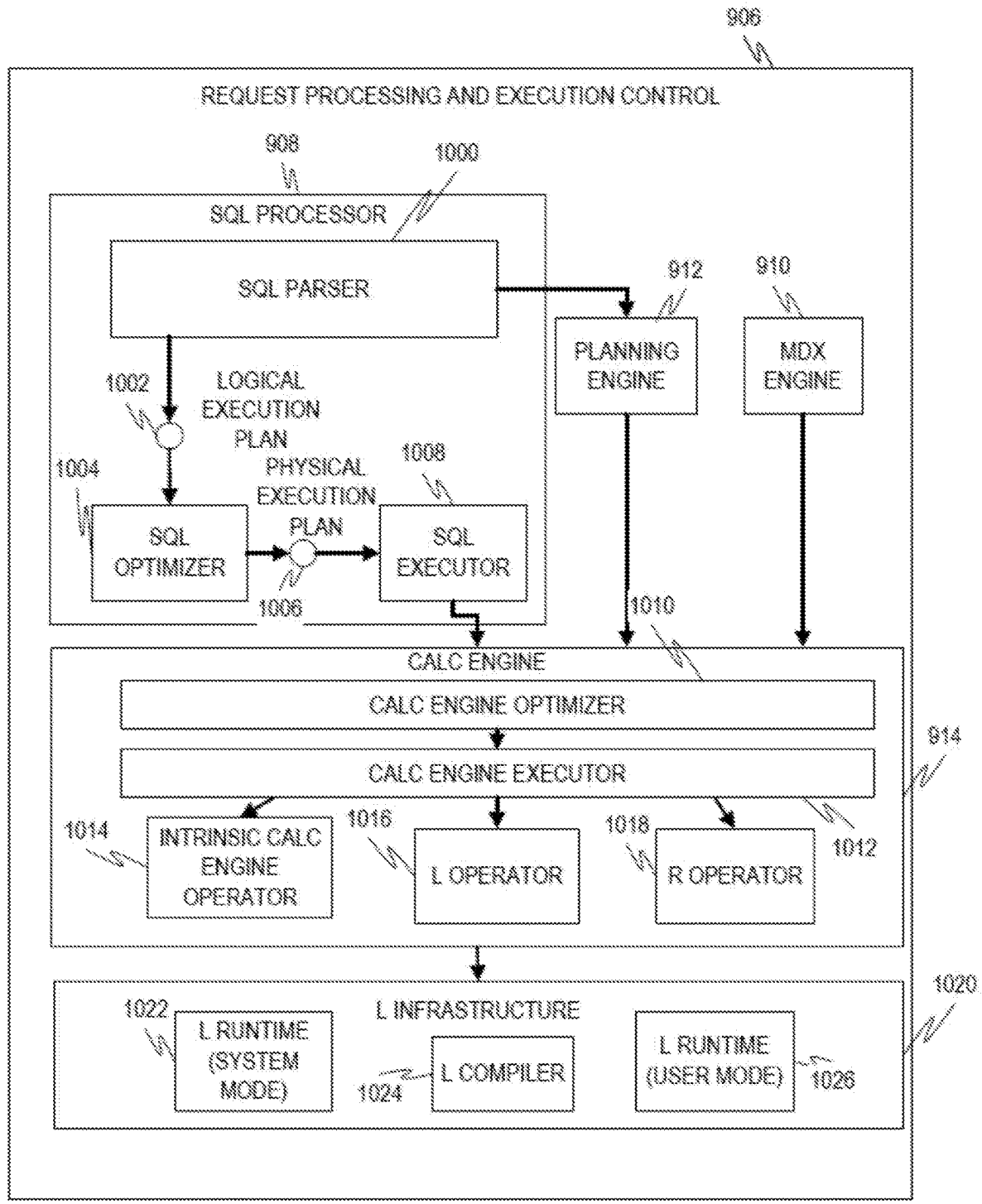
FIG. 10 is a diagram illustrating one example of the request processing and execution control of FIG. 9.

FIG. 10 is a diagram illustrating one example of the request processing and execution control 906. This diagram depicts the request processing and execution control 906 of FIG. 9 in more detail. The SQL processor 908 contains an SQL parser 1000, which parses the SQL statement and generates a logical execution plan 1002, which it passes to an SQL optimizer 1004. The SQL optimizer 1004 optimizes the logical execution plan 1002 and converts it to a physical execution plan 1006, which it then passes to a SQL executor 1008. The calculation engine 914 implements the various SQL script and planning operations, and includes a calc engine optimizer 1010, which optimizes the operations, and a calc engine executor 1012, which executes the operations, as well as an intrinsic calc engine operator 1014, an L operator 1016, and an R operator 1018.

An L infrastructure 1020 includes a number of components to aid in the running of L procedures, including an L-runtime (system mode) 1022, an L compiler 1024, and an L-runtime (User mode) 1026.

Figure 11:
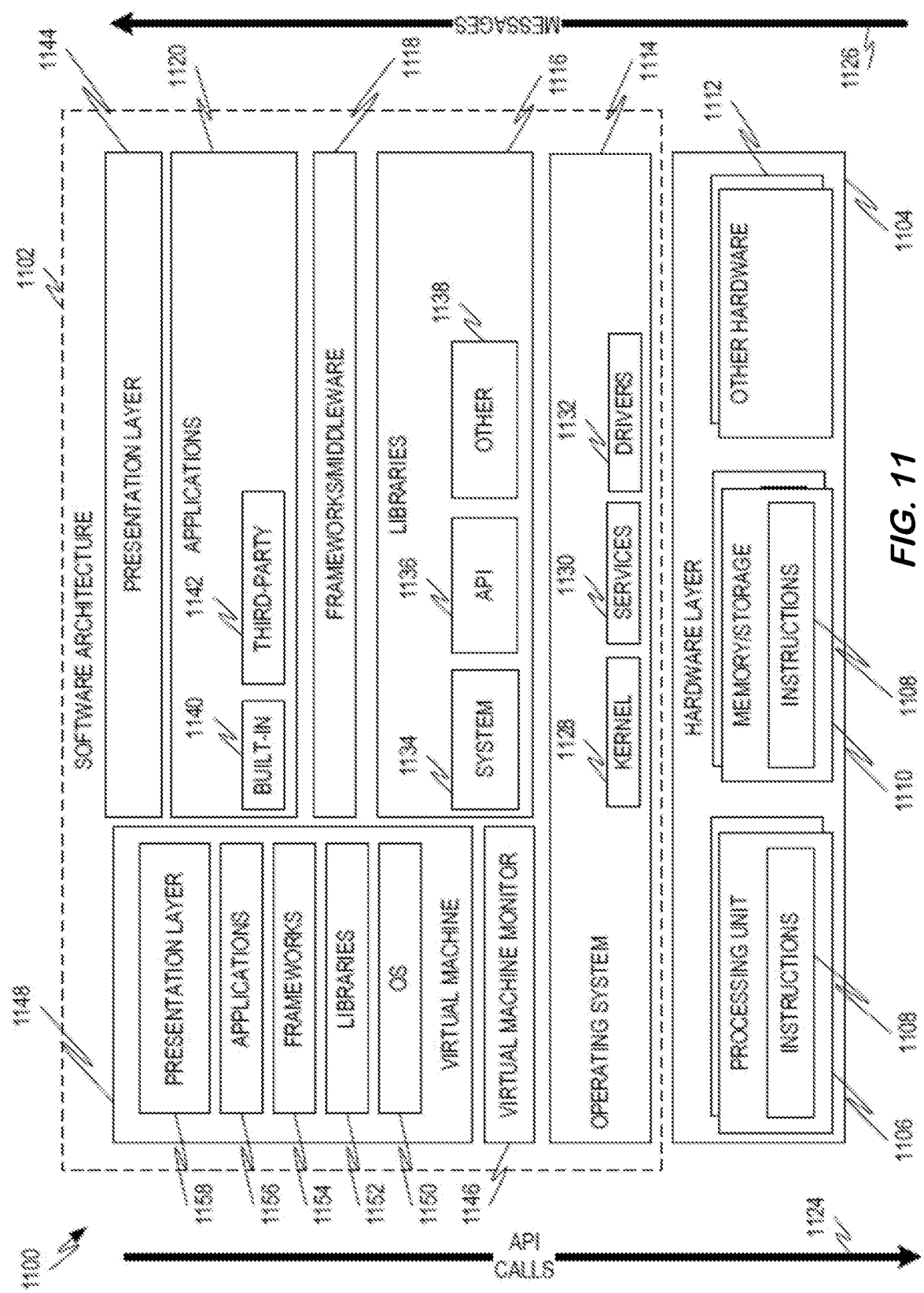
FIG. 11 is a block diagram showing one example of a software architecture for a computing device.

FIG. 11 is a block diagram 1100 showing one example of a software architecture 1102 for a computing device. The architecture 1102 may be used in conjunction with various hardware architectures, for example, as described herein. FIG. 11 is merely a non-limiting example of a software architecture and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system 1200 of FIG. 12.

The representative hardware layer 1104 comprises one or more processing units 1106 having associated executable instructions 1108. Executable instructions 1108 represent the executable instructions of the software architecture 1102, including implementation of the methods, modules, subsystems, and components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of computer system 1200.

In the example architecture of FIG. 11, the software architecture 1102 may be conceptualized as a stack of layers where each layer provides particular functionality. For example, the software architecture 1102 may include layers such as an operating system 1114, libraries 1116, frameworks/middleware 1118, applications 1120 and presentation layer 1144. Operationally, the applications 1120 and/or other components within the layers may invoke Application Programming Interface ("API") calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware layer 1118, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the architecture 1102 to pause its current processing and execute an Interrupt Service Routine ("ISR") when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus ("USB") drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system 1134 libraries (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules. In some examples, libraries 1138 may provide one or more APIs serviced by a message oriented middleware.

The frameworks 1118 (also sometimes referred to as middleware) may provide a higher-level common infrastructure that may be utilized by the applications 1120 and/or other software components/modules. For example, the frameworks 1118 may provide various GUI functions, high-level resource management, high-level location services, and so forth. The frameworks 1118 may provide a broad spectrum of other APIs that may be utilized by the applications 1120 and/or other software components/modules, some of which may be specific to a particular operating system or platform.

The applications 1120 includes built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built-in operating system functions (e.g., kernel 1128, services 1130 and/or drivers 1132), libraries (e.g., system 1134, APIs 1136, and other libraries 1138), frameworks/middleware 1118 to create user interfaces to interact with users of the system. Alternatively, or additionally, in some systems interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine as well as the interface with the host operating system (i.e., operating system 1114). A software architecture executes within the virtual machine such as an operating system 1150, libraries 1152, frameworks/middleware 1154, applications 1156 and/or presentation layer 1158. These layers of software architecture executing within the virtual machine 1148 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a Field Programmable Gate Array ("FPGA") or an Application-Specific Integrated Circuit ("ASIC")) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 12:
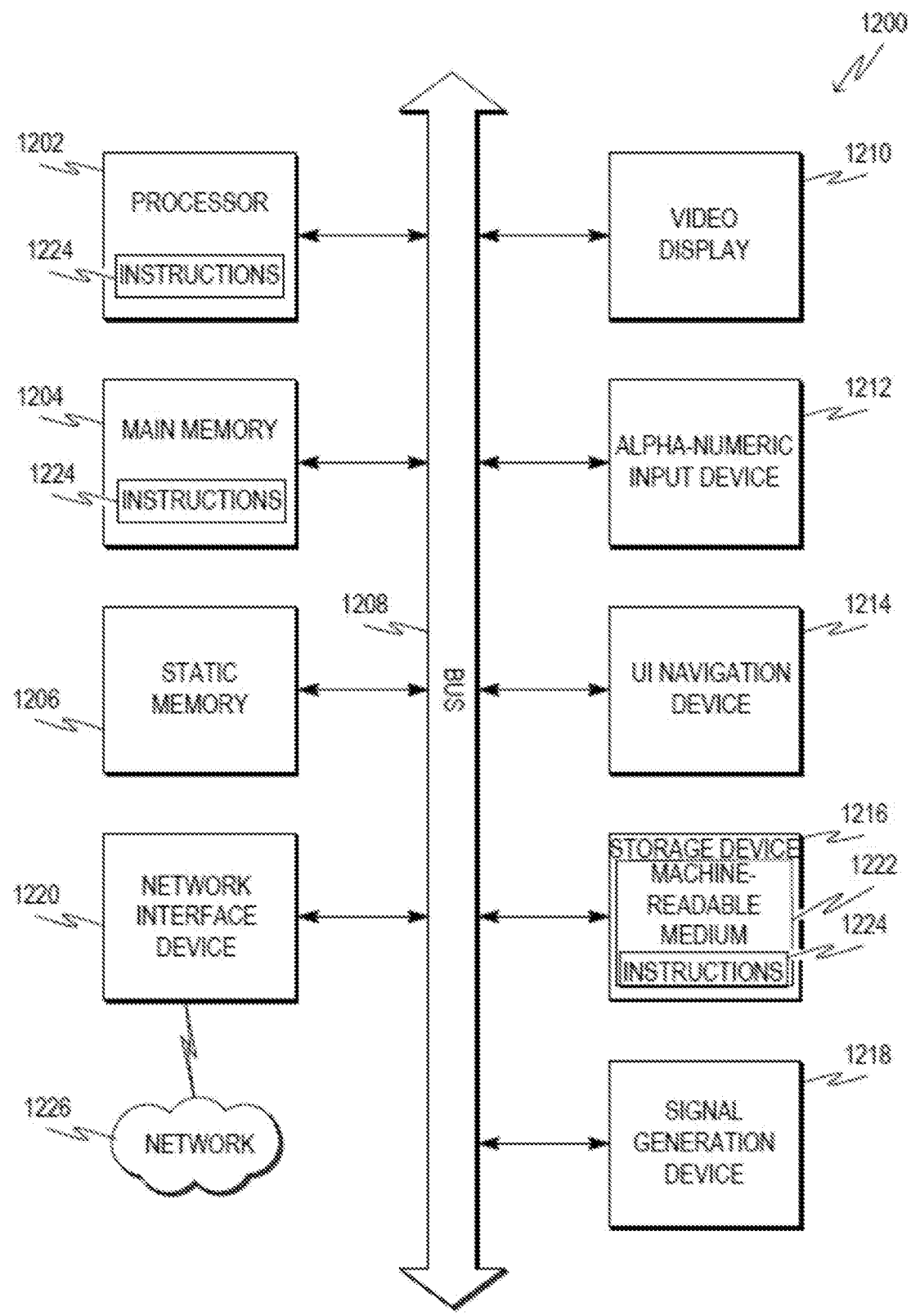
FIG. 12 is a block diagram of a machine in the example form of a computer system within which instructions may be executed for causing the machine to perform any one or more of the methodologies discussed herein.

FIG. 12 is a block diagram of a machine in the example form of a computer system 1200 within which instructions 1224 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a Personal Computer ("PC"), a tablet PC, a set-top box, a Personal Digital Assistant ("PDA"), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a CPU), a graphics processing unit, or both), a main memory 1204, and a static memory 1206, which communicate with each other via a bus 1208. The computer system 1200 may further include a video display unit. The computer system 1200 also includes an alphanumeric input device 1212 (e.g., a keyboard or a touch-sensitive display screen), a UI navigation (or cursor control) device 1214 (e.g., a mouse), a disk drive unit 1216, a signal generation device 1218 (e.g., a speaker), and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., Erasable Programmable Read-Only Memory ("EPROM"), Electrically Erasable Programmable Read-Only Memory ("EEPROM"), and flash memory devices; magnetic disks such as internal hard disks and removable disks; magneto-optical disks; and CD-ROM and DVD-ROM disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a MAN, LAN, a Wide Area Network ("WAN"), the Internet, mobile telephone networks, Plain Old Telephone Switching ("POTS") networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Figure 13:
FIG. 13 is table 1300 illustrating a training data example in accordance with some embodiments.

In this way, embodiments might utilize programmable-network traffic statistics to improve a resource allocation prediction, trained with machine learning, at a data center. FIG. 13 is table 1300 illustrating a training data example in accordance with some embodiments. The table 1300 includes information about how many queries of various types have been processed 1302, 1304, 1306, 1308 along with CPU usage 1310 and memory usage 1312. For this prediction, embodiments may train a General Regression Neural Network ("GRNN"). The GRNN may have, in some embodiments, spread as only one free parameter. The spread is the distance of an input from a neurons weight. Some embodiments may simulate the GRNN on Matlab with spread value of 0.6. This value of spread may give the best regression fit associated with Mean Squared Error ("MSE") for training and testing. With this configuration, embodiments may achieve a 97.35% of training accuracy and 93.22% of testing accuracy in predicting the value of response time. This regression can be modelled as f(L1, L2, L3, . . . , Ln)=(CPU percentage, memory, IO, . . . ). When the GRNN is trained, the system may sample the queries from the previous month's data using a relatively low frequency (e.g., from approximately 15 to approximately 20 minutes). Using the same testbed from the obtained queries, embodiments may operate the GRNN to get delta change in resources (CPU %, Memory, IO, etc.). If the delta change exceeds the threshold value (which could be configured), vertical scaling of IaaS resource (virtual machines or containers) may occur as appropriate.

Thus, embodiments may use real-time traffic-statics from a programmable-network module to predict the resource usage that will be induced by the activity of the users. This prediction enables the platform to make a conscious proactive decision whether and when to scale its resources to sufficiently meet the customer demand without compromising on the quality factors like client experience, QoS, availability of a service, etc.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Figure 14:
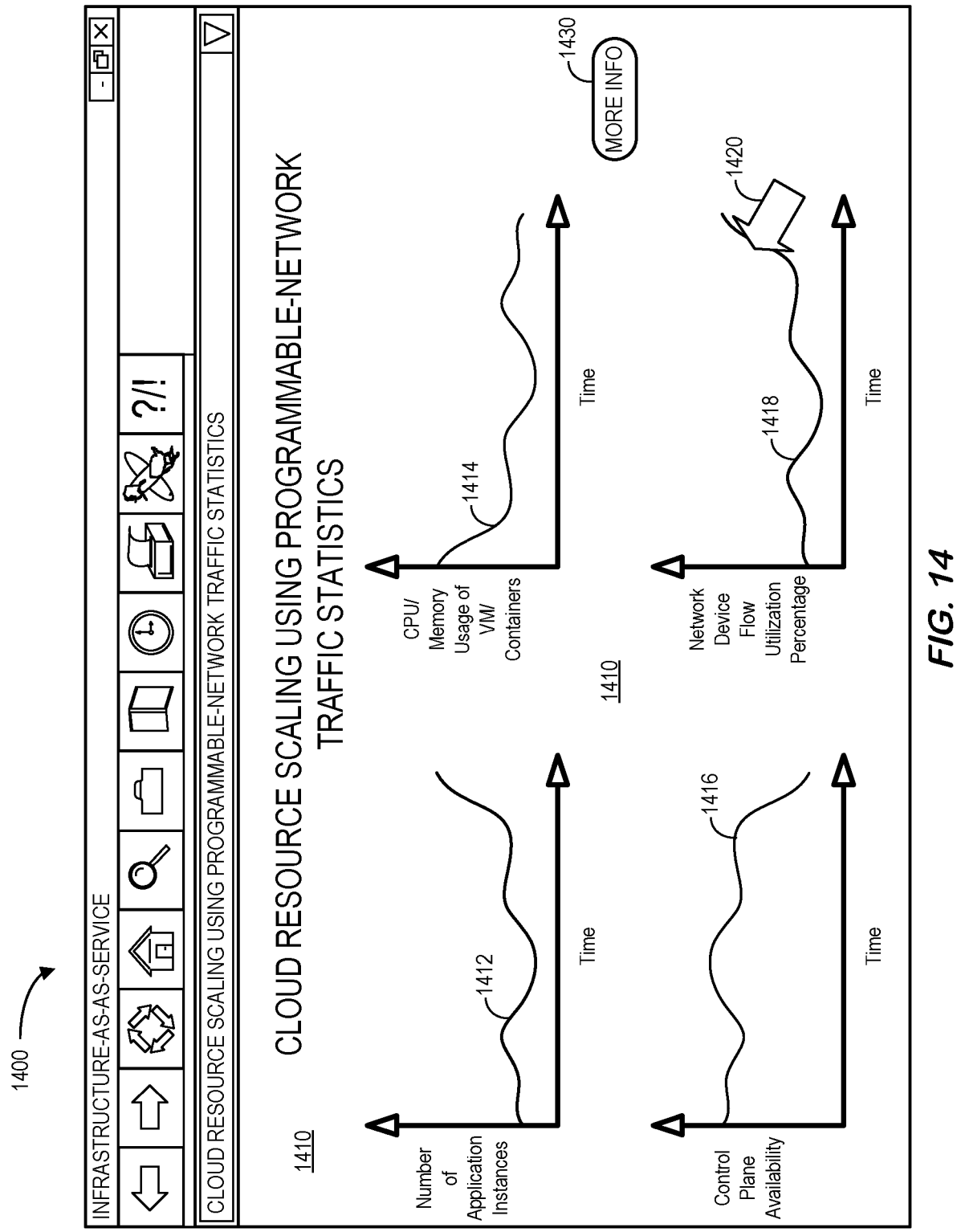
FIG. 14 is a system display in accordance with some embodiments.

Some embodiments have been described with respect to ERP solutions but embodiments may be associated with other types of cloud based data center solutions. Moreover, information may be provided (e.g., to an operator or administrator) in any number of different ways. For example, FIG. 14 illustrates an interactive Graphical User Interface ("GUI") display 1400 that might display information about a system according to some embodiments. The display 1400 includes a graphic representation 1410 or dashboard that might be used to monitor the health of a cloud resource framework. In particular, the display 1400 contains graphs showing, over time, a number of application instances 1412, CPU/memory usage of VM and contains 1414, control plane availability 1416, network device flow utilization percentage 1418, etc. Selection of portions of the graphic representation 1410 (e.g., by touchscreen or computer mouse pointer 1450) may result in the display of additional information about an element and/or allow an operator to adjust a parameter associated with the cloud resource. Similarly, selection of a "More Info" icon 1430 may let the user request additional data (e.g., to investigate system performance).

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system associated with effective cloud-resource scaling for a data center, comprising:
   a data center computing system comprising at least one processor and at least one memory in communication with the at least one processor, wherein the data center computing system is programmed to perform operations including:
      collecting programmable-network real-time traffic statistics associated with enterprise resource planning users,
      predicting, by a mathematical regression machine learning prediction module of a network control layer control plane, a network and enterprise resource planning load for the enterprise resource planning users based on an analysis of past programmable-network real-time traffic statistics and current enterprise resource planning user activity, and
      dynamically allocating network resources of a plurality of virtual machines, each having a plurality of containers, associated with an Infrastructure-as-a-Service ("IaaS") layer for the enterprise resource planning users based on the predicted network and enterprise resource planning load.

2. The system of claim 1, wherein enterprise resource planning users and customers access web applications provisioned by a Platform-as-a-Service ("PaaS") which can run on any IaaS having all hyperscale features.

3. The system of claim 1, wherein the real-time traffic statistics are associated with an OpenFlow architecture.

4. The system of claim 1, wherein programmable-network real-time traffic statistics are used to monitor user activity to determine whether or not the user is in a network.

5. The system of claim 4, wherein the prediction model is associated with clustering based on query hit times, a Central Processing Unit ("CPU") usage, and a memory usage.

6. The system of claim 4, wherein the analysis further comprises aggregating clusters for specific users.

7. The system of claim 4, wherein the programmable-network real-time traffic statistics are associated with timeslot data collected by a monitoring module and a container monitoring module in a network control layer of the data center.

8. A method associated with effective cloud-resource scaling for a data center, comprising:
   collecting programmable-network real-time traffic statistics associated with enterprise resource planning users;
   predicting, by a mathematical regression machine learning prediction module of a network control layer control plane, a network and enterprise resource planning load for the enterprise resource planning users based on an analysis of past programmable-network real-time traffic statistics and current enterprise resource planning user activity; and
   dynamically allocating network resources of a plurality of virtual machines, each having a plurality of containers, associated with an Infrastructure-as-a-Service ("IaaS") layer for the enterprise resource planning users based on the predicted network and enterprise resource planning load.

9. The method of claim 8, wherein enterprise resource planning users and customers access web applications provisioned by a Platform-as-a-Service ("PaaS") which can run on any IaaS having all hyperscale features.

10. The method of claim 8, wherein the real-time traffic statistics are associated with an OpenFlow architecture.

11. The method of claim 8, wherein programmable-network real-time traffic statistics are used to monitor user activity to determine whether or not the user is in a network.

12. The method of claim 11, wherein the prediction module is associated with clustering i-s based on query hit times, a Central Processing Unit ("CPU") usage, and a memory usage.

13. The method of claim 11, wherein the analysis further comprises aggregating clusters for specific users and the programmable-network real-time traffic statistics are associated with timeslot data collected by a monitoring module and a container monitoring module in a network control layer of the data center.

14. A non-transitory, machine-readable medium comprising instructions thereon that, when executed by a processor, cause the processor to execute operations, associated with effective cloud-resource scaling for a data center, comprising:
   collecting programmable-network real-time traffic statistics associated with enterprise resource planning users;
   predicting, by a General Regression Neural Network ("GRNN") prediction module of a network control layer control plane, a network and enterprise resource planning load for the enterprise resource planning users based on an analysis of past programmable-network real-time traffic statistics and current enterprise resource planning user activity; and dynamically allocating network resources of a plurality of virtual machines, each having a plurality of containers, associated with an Infrastructure-as-a-Service ("IaaS") layer for the enterprise resource planning users based on the predicted network and enterprise resource planning load.

15. The medium of claim 14, wherein the programmable-network real-time traffic statistics further include at least one of memory usage values and Central Processing Unit ("CPU") utilization values.

* * * * *